(12) United States Patent
Kloza

(10) Patent No.: US 7,359,039 B2
(45) Date of Patent: Apr. 15, 2008

(54) DEVICE FOR PRECISE DISTANCE MEASUREMENT

(76) Inventor: Mariusz Kloza, 108 N. Oakwood Ave., Willow Springs, IL (US) 60481

( * ) Notice: Subject to any disclaimer, the term of this patent is extended or adjusted under 35 U.S.C. 154(b) by 0 days.

(21) Appl. No.: 11/292,511

(22) Filed: Dec. 2, 2005

(65) Prior Publication Data

US 2007/0024841 A1     Feb. 1, 2007

Related U.S. Application Data

(60) Provisional application No. 60/698,697, filed on Jul. 13, 2005.

(51) Int. Cl.
*G01C 3/08* (2006.01)

(52) U.S. Cl. ........................... 356/5.03

(58) Field of Classification Search ............... 356/5.03
See application file for complete search history.

(56) References Cited

U.S. PATENT DOCUMENTS

| 4,274,736 | A | | 6/1981 | Balmer |
| 4,768,877 | A | | 9/1988 | Torregrosa et al. |
| 4,770,526 | A | * | 9/1988 | Manhart et al. ........... 356/5.07 |
| 5,179,286 | A | | 1/1993 | Akasu |
| 5,609,059 | A | | 3/1997 | McEwan |
| 5,745,442 | A | | 4/1998 | Herscher |
| 5,877,851 | A | * | 3/1999 | Stann et al. ............... 356/5.09 |
| 5,892,576 | A | | 4/1999 | Gaechter |
| 5,949,531 | A | | 9/1999 | Ehbets et al. |
| 6,115,112 | A | | 9/2000 | Hertzman et al. |
| 6,545,749 | B1 | | 4/2003 | Andersson |
| 6,690,320 | B2 | | 2/2004 | Benway et al. |
| 6,836,317 | B1 | | 12/2004 | Perger |
| 6,903,680 | B2 | * | 6/2005 | Samukawa et al. ......... 342/173 |
| 2004/0178947 | A1 | | 9/2004 | Richley et al. |

* cited by examiner

*Primary Examiner*—Thomas H. Tarcza
*Assistant Examiner*—Luke D. Ratcliffe
(74) *Attorney, Agent, or Firm*—IP Focus Law Group Ltd.

(57) ABSTRACT

An electronic method for distance measurement based on pulsed laser time-of-flight is provided. The method comprises generating a wave of outgoing radiant energy pulses having a substantially stable period for providing a wave of pulses reflected from a target object and then measuring reflected energy from the pulse wave over a scanning time window. The scanning time window is shorter than the laser pulse time-of-flight to and from the measurement target. An offset between outgoing pulses and the scanning window is adjusted to capture reflected pulses at desired positions within the scanning window for selected conditions including when the outgoing wave is reflected from a reference surface and when the outgoing wave is reflected from the distance target. Distance is then calculated according to the offset and reflected energy data recorded for the selected conditions.

20 Claims, 12 Drawing Sheets

CONTINUED AT FIG. 2B

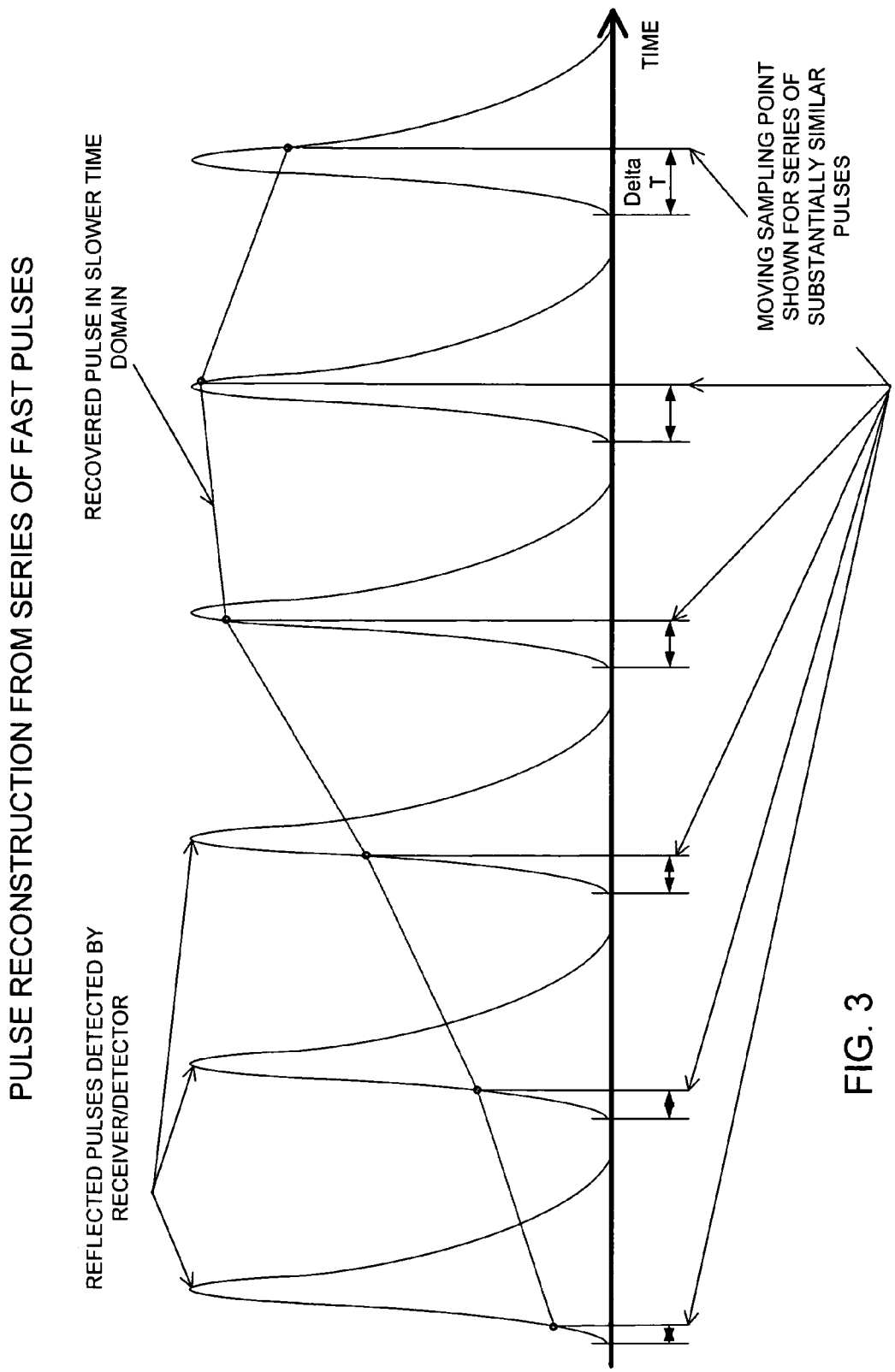

DEVICE FOR PRECISE DISTANCE MEASUREMENT

CROSS-REFERENCE TO RELATED APPLICATION

This application claims priority from U.S. Provisional Applications for Pat. No. 60/698,697 filed on 13 Jul. 2005.

FIELD OF INVENTION

This invention pertains to distance measuring methods, circuits and devices based on reflected electromagnetic wave energy.

COPYRIGHT NOTIFICATION

Portions of this patent application contain materials that are subject to copyright protection. The copyright owner has no objection to the facsimile reproduction by anyone of the patent document, or the patent disclosure, as it appears in the Patent and Trademark Office.

BACKGROUND OF THE INVENTION

The advantages of accurately and precisely measuring distance by energy reflection are self evident in that the need to physically traverse the distance with a tape or a counter is eliminated. The concept is to measure the time required for an incident of radiant energy to travel to and then from a target point. Based on this time of flight and the known speed of electromagnetic radiation, the distance from the measuring device to the target point can be calculated.

Development of techniques for precisely measuring shorter distances (e.g., <100 meters) with reflected laser has been technically challenging, however, because of the relative speed of electromagnetic radiation as compared to digital processing capabilities. More specifically, most available techniques struggle with the resolution of obtained results. Light travels in air at the speed of about 300 million meters per second. To measure distance with a resolution of one millimeter (mm), the radiant flight-time resolution would have to be in a range of 3 picoseconds ($3 \times 10^{-12}$ seconds).

Efforts at addressing this challenge for laser distance measurement are reflected in available patent documents. For example, U.S. Pat. No. 6,115,112 to Hertzman et al. describes using an initial measuring time interval longer than an estimated propagation time of the light signal to and from a target. U.S. Pat. No. 5,892,576 to Gaechter is directed to a method in which a special pulse pattern comprising echo signals for each of a series of pulses is used to determine the distance to an object producing the echoes.

Devices based on detecting phase changes between transmitted and reflected signals are represented by U.S. Pat. No. 5,949,531 to Ehbets et al. The '531 patent is directed to a device that calculates distance to a target based on the modulation phase shift of a beam of short pulses.

Although such laser-based range finders are known, this conventional technology offers equipment that is typically expensive and rather bulky. The market for such conventional devices is therefore somewhat limited. It would be desirable to provide methods and systems to accurately and precisely measure distance based on radiant energy reflection using relatively inexpensive components making possible a smaller, more cost-effective device.

BRIEF SUMMARY OF THE INVENTION

The invention is embodied in an electronic distance measuring system based on radiant energy time of travel to and from a target object and the measuring device. In accordance with the apparatus and method aspects of the invention, reflected pulses are preferably scanned in a time window that is shorter than the radiation time-of-flight to and from the measurement target.

A method aspect of the invention comprises generating a wave of outgoing radiant energy pulses having a substantially stable period for providing a wave of pulses reflected from a target object and then measuring reflected energy from the pulse wave over a scanning time window. The scanning window preferably has a shorter effective duration than the time of travel to and from the target object, and the outgoing pulses preferably have a duration (i.e., pulse length) shorter than the period of their generation. As used herein, the term "wave" is a reference to a repeating pattern.

The method further includes setting an offset between the outgoing pulses and the scanning window to capture reflected pulses at desired positions within the scanning window, recording offset and reflected energy data for selected conditions, and then calculating the distance between a reference surface and a target object according to the offset and reflected energy data recorded for the selected conditions. The selected conditions include when the outgoing wave is reflected from a reference surface and the offset has been set to capture reflected pulses in a first time position in the scanning window, when the outgoing wave is reflected from the reference surface and the offset has been set to capture reflected pulses in a second time position in the scanning window, and when the outgoing wave is reflected from the target object and the offset has been set to capture reflected pulses in the scanning window. The reference surface is a fixed distance from the point of generating the wave and from the point of measuring reflected energy.

The recording of offset and reflected energy data when the offset has been set to capture pulses reflected from the reference surface in a first time position in the scanning window provides a first reference pulse data set. The recording of offset and reflected energy data when the offset has been set to capture pulses reflected from the reference surface in a second time position in the scanning window provides a second reference pulse data set. In a preferred embodiment, the first reference position and the second reference position have an effective time separation shorter than time of travel of a pulse to and from the measurement target and the measuring device. The recording of offset and reflected energy data when the outgoing wave is reflected from the target object and the offset has been set to capture reflected pulses in the scanning window provides an object pulse data set.

The distance between the reference surface and the target object is calculated according to the first reference data set, the second reference data set and the object data set.

A system aspect of the following invention provides a measuring device for measuring distance to a target object based on the time of travel of an energy pulse to and from the target object. The measuring device includes a pulse transmitter that transmits a beam of repeating pulses, a pulse receiver, a reference surface capable of reflecting at least a portion of the beam and spaced a fixed distance from the receiver, a scanning module, a pulse placement module that controls the transmitter and obtains data from the scanning module, and a calculation module that processes the pulse and offset data to calculate the distance from the device to the target object based on this data.

The pulse receiver includes a radiant energy detector and a sampling circuit that is responsive to a sampling control input and provide an output. The sampling circuit is in communication with the radiant energy detector and is configured to provide at the output a measure of radiant energy at the detector. The pulse transmitter transmits a beam of repeating pulses having a substantially stable period of oscillation. The transmitter includes a trigger control input and an emitter circuit that is responsive to this input.

The scanning module is configured to be in communication with the pulse receiver and controls the sampling control input to record radiant energy detected by the receiver over a time window shorter than the time of flight to and from the target object and the device. The pulse placement module obtains data of the output from the scanning module and sets the trigger control input to adjust offsets in time between the time window and the repeating pulses. The placement module obtains pulse detection data for beams reflected from the reference surface at different settings for the trigger control input. The trigger control input is adjusted to place the different reference surface pulse trains within the scanning window. The placement module then records data and adjusts the trigger controls to place a pulse train at a desired time position within the time window when the beam is directed to the target object.

The calculation module processes pulse detection data for the pulse placement operation and also estimates the distance from the measuring device to the target object based on the data obtained from the desired pulse trains captured in the time window.

BRIEF DESCRIPTION OF THE DRAWINGS

In the accompanying drawings that form part of the specification,

FIG. 3 is a repeating-pulse graph diagram for explaining a pulse series scanning technique according to the invention;

FIG. 4 contains a group of graphs for pulse data detected and recorded for different pulse series to show pulse shape and amplitude variance before normalization and after normalization;

Figure 1:
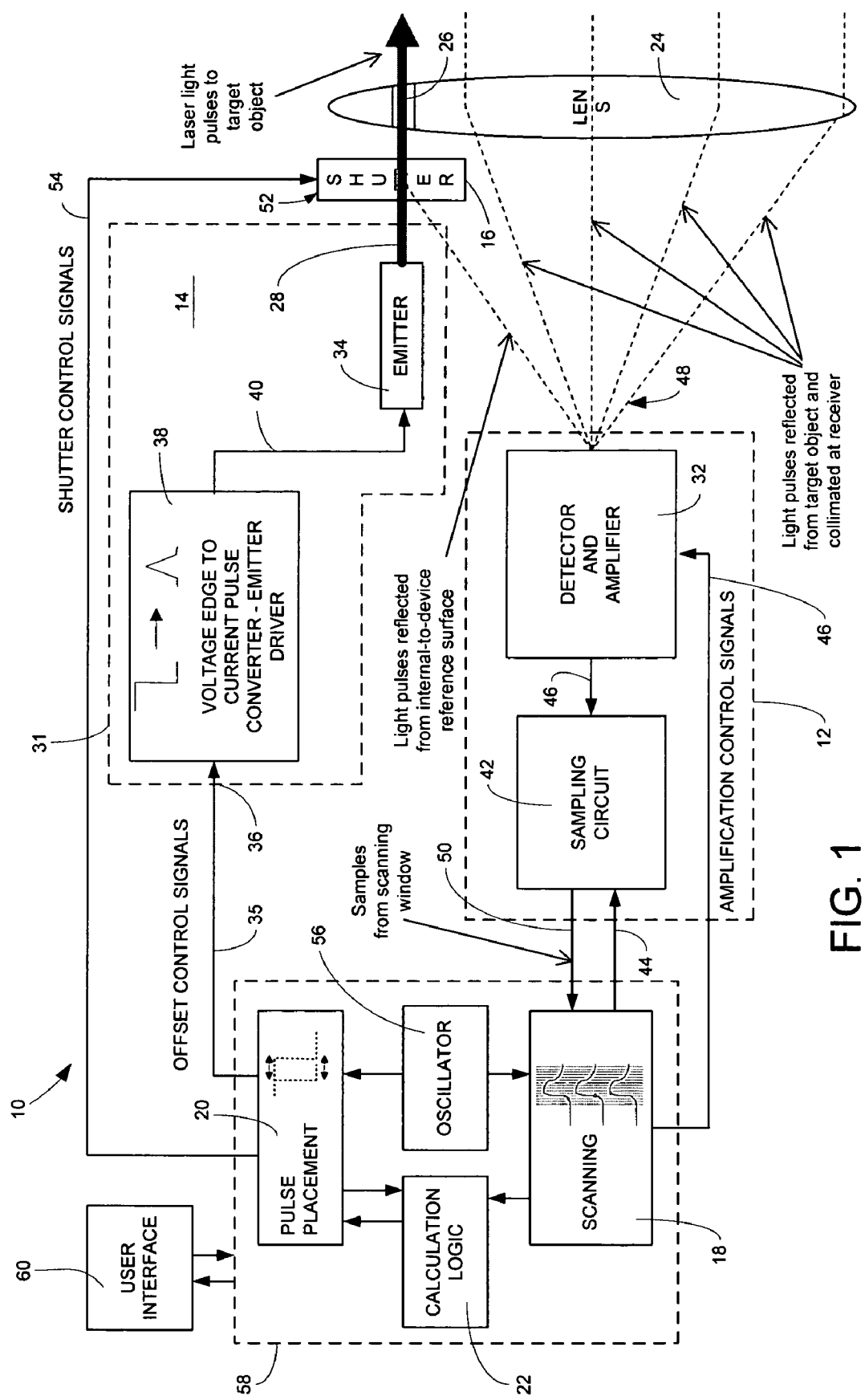
FIG. 1 is a schematic diagram of an electronic distance measuring device according to an embodiment of this invention.

In the drawings, a single block or cell may indicate several individual components and/or circuits that collectively perform a single function. Likewise, a single line may represent several individual signals or energy transmission paths for performing a particular operation.

DETAILED DESCRIPTION OF THE INVENTION

While this invention is susceptible to embodiment in many different forms, this specification and the accompanying drawings disclose only preferred forms as examples of the invention. The invention is not intended to be limited to the embodiments so described, however. The scope of the invention is identified in the appended claims.

The elements of a measuring device 10 according to a preferred embodiment of the invention are shown schematically in FIG. 1. Measuring device 10 includes a pulse receiver 12, a pulse transmitter 14, a reference surface 16, a scanning module 18, a pulse placement module 20, and a calculation module 22. The term "module," as used herein refers to a logic electronic element such as program, subprogram, software or firmware process, subroutine, or grouping of code segments running on processor, microprocessor or microcontroller either alone or with other programs, and includes electronic circuits, programmable electronic components such as microcontrollers, smart electronic components, a combinational logic circuit and application specific integrated circuits (ASICs) containing logic. Device 10 also includes collimating optics in the form of a lens 24. In a preferred embodiment, lens 24 includes an exit region 26 for directing a pulse beam 28 towards a target object.

Pulse receiver 12 and pulse transmitter 14 are positioned for operation with optics 24. More specifically, receiver 12 has a detector component 30 positioned to receive electromagnetic radiation concentrated by optics 24. Transmitter 14 preferably takes the form of an emitter circuit 31 with a coherent radiation emitter 34 for generating a beam of pulses 28 directed through zone 26 of lens 24. Although emitter 34 is preferably a visible-spectrum laser emitter, other energy forms are contemplated including non-visible spectrum radiation.

In addition to emitter 34, emitter circuit 31 includes a trigger control input 36 and a signal converter subcircuit 38. In a preferred embodiment, converter subcircuit 38 is a voltage-edge to current-pulse converter that creates a current pulse signal suitable for energizing an emitter such as a laser diode. Accordingly, emitter circuit 31 is configured to receive an oscillating voltage signal at trigger control input 36 and to convert this oscillating voltage signal to a current pulse signal 40 suitable for driving emitter 34.

In addition to radiant energy detector 32, pulse receiver 12 includes a sampling circuit 42 and two inputs, a sampling control input 44 and an amplification input 46. Detector 32 generates a detection signal 46 in response to the level of radiant energy 48. Sampling circuit 12 is configured to sample a characteristic of detection signal 46 and hold it at output 50 in response to control input 44. Detector 32 preferably generates a voltage-variable, amplified detection signal 46 such that sampling circuit 42 holds this sampled detection signal voltage level at output 50 in response to a predetermined voltage level (e.g., 1.024 volts) at sampling control input 44.

The operation of receiver 12 and pulse transmitter 14 is controlled and coordinated by pulse placement module 20 and scanning module 18. Scanning module 18 drives sampling circuit 42 by providing and also biasing an oscillating signal to input 44. With this configuration, scanning module 18 captures the detection signal at a different time increment within the cycle of oscillation of input 44 depending upon the bias level. Scanning module 18 biases input 44 over a series of values and obtains and records a corresponding series of pulse detection data from output 50. As described in greater detail below, this scanning operation is controlled such that reflected pulse series are preferably scanned over a time window that is shorter than the time of flight for pulses to and from a distance measurement target object and measuring device.

As used herein, the terms "scanning window," "time window," and "scanning time window" are a reference to an effective time span in which the inventive method calls for a higher resolution scan and detection data collection. A requirement that the scanning window has a relatively short time span does not preclude lower resolution radiation energy sampling outside the narrow scanning window. It is contemplated that methods according to the present invention may include sparse sampling outside the time window. The scanning window is a zone of relatively higher resolution scanning for tracking pulse shape characteristics. A specification that the scanning window should be shorter in duration than the pulse time of flight to and from the target object is a reference to focusing high-resolution scanning over a relatively short time span. The term "shape scanning" is a reference to higher resolution scanning over a shorter range than the time of flight to obtain shape characteristics of reflected pulses.

Pulse placement module 20 communicates with scanning module 18 and transmitter 14 to direct the placement of reflected pulse series into the scanning time window by adjusting a characteristic of trigger control input 36. Pulse placement module 20 is preferably configured to adjust the duty-cycle characteristic (i.e., pulse-width) of an oscillating signal provided to input 36 though other arrangements are contemplated. The adjustments to duty-cycle at input 36 are translated to changes in the incremental intracycle timing of current pulse signal 40 and therefore, the timing of pulses at beam 28. Pulse placement module 20 also provides control of shutter mechanism 52 via control signal 54. Control signal 54 is set to move shutter 52 between a reference position when a pulse beam is reflected from reference surface 16 to a targeting position when pulse beam 28 is directed at a distance target. As discussed in greater detail below, shutter mechanism is actuated during a measurement cycle to provide reflected pulses from both reference surface 16 and the distance target.

Calculation module 22 processes reflected pulse data obtained from receiver 12. Exemplary calculations include normalization and correlation. Data sets corresponding to different reflected pulse series are normalized in amplitude and slope to reconcile shape variations. Calculation module 22 also provides a special calculation of the separation time between reflected pulse series using statistical correlation among multiple data points for each pulse series. Given pulse data for selected conditions obtained from scanning module 20, calculation module 22 calculates the distance between device 10 and a distance measurement target.

The operation of receiver 12 and pulse transmitter 14 are coordinated and synchronized by a shared reference oscillator 56. Oscillator 56 is preferably a resonator-regulated oscillator such as a fundamental mode quartz crystal oscillator, overtone mode quartz crystal oscillator, surface acoustic wave oscillator or a film bulk acoustic resonator (FBAR) oscillator. The relative timing of pulse scanning and pulse series generation are precisely coordinated by this shared timing reference such that an offset between a scanning time window and pulse transmission can be controlled.

Pulse placement module 20, scanning module 18 and calculation module 22 are preferably integrated into an IC semiconductor chip or a multichip module 58. These modules communicate with user interface elements 60 such as a display for presenting the calculated distance measurement and one or more buttons to allow a user to start a measurement cycle. Oscillator 56 is also preferably integrated in chip 58. Certain selected circuit elements for these modules may be discrete and off-chip. For example, the circuit elements for oscillator 56 may be substantially integrated while the resonator is off-chip. The presently preferred chip module for controller 58 is commercially available from Texas Instruments (Dallas, Tex.) under the designation "TMS320F2801."

Figure 2A:
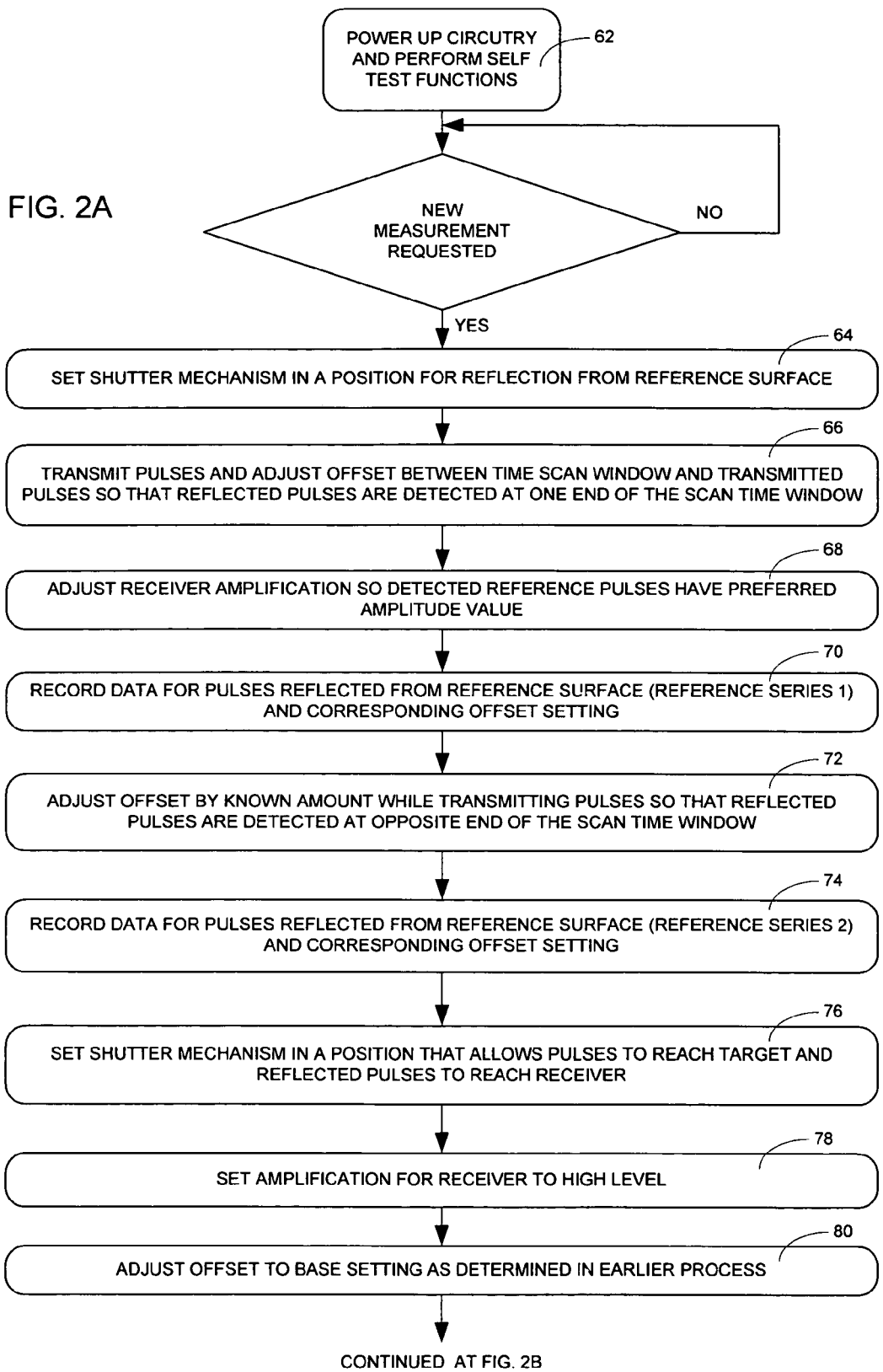
FIGS. 2A and 2B are a simplified flowchart of a preferred method according to the invention for electronic distance measurement based on the time of travel of electromagnetic pulses to and from a measurement target.
Figure 2B:
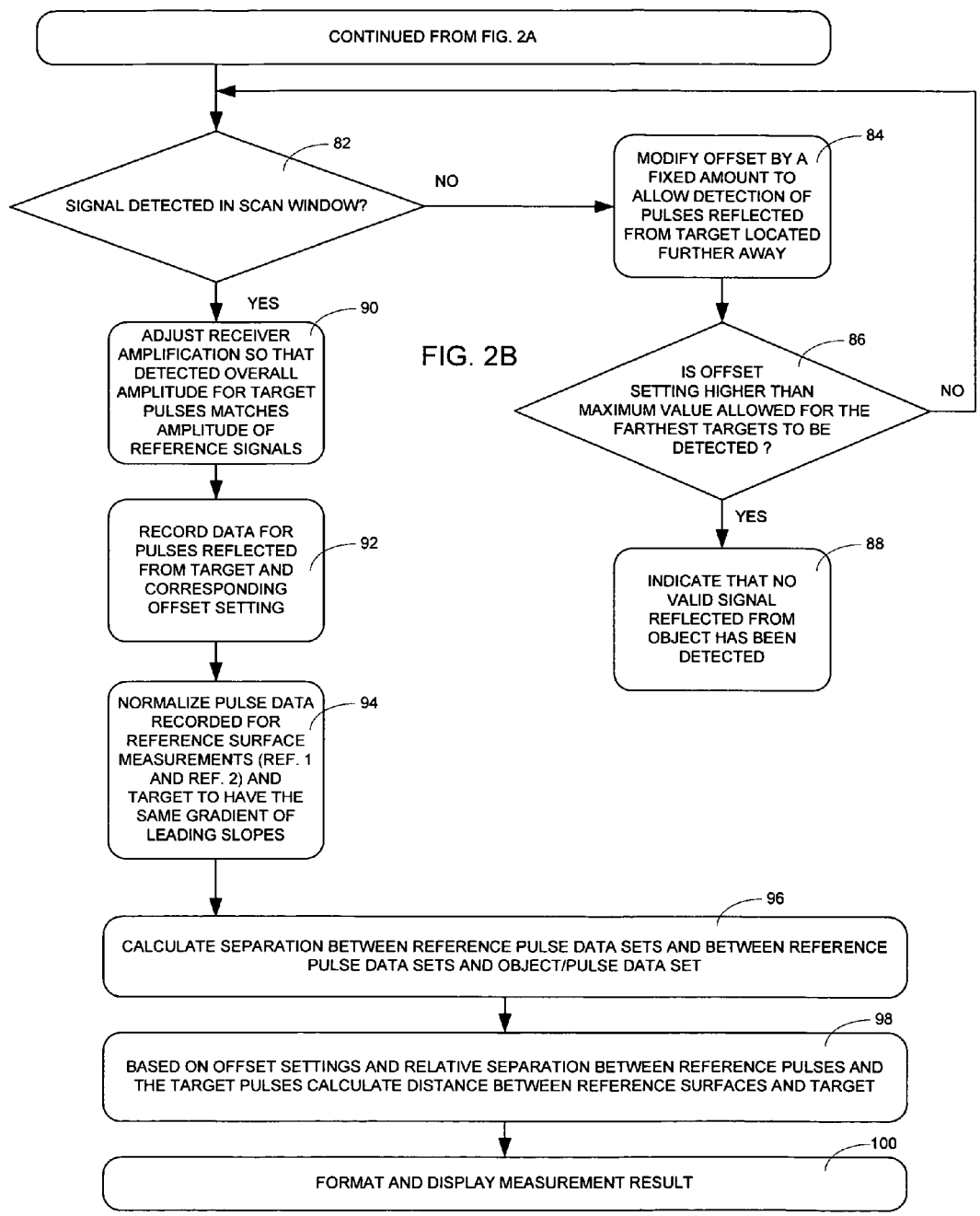

The preferred operation and programming of measurement device 10 as well as a method aspect of the invention are described in the flow chart presented in FIGS. 2A and 2B. Referring to the start of the flow chart (FIG. 2A), upon power up device 10 performs self test functions of its circuits and components (box 62). A measurement cycle begins with a confirmation that the shutter/lens control signal 54 is set to the position for pulse reflection from the reference surface (box 64). As discussed in greater detail below with reference to FIGS. 11 and 12, several configurations are contemplated for implementing control of the pulse beam path.

With the shutter/lens mechanism 52 set for reference surface reflection, transmitter 14 is energized and the offset control signal 35 at input 36 is set so that reflected pulses are detected at one end of the scan time window (box 66). Offset adjustments are incremental and consistently proportional to a measure of time. As described further below, a preferred technique for controlling offset is to control the duty-cycle (i.e., pulse-width) for an oscillating signal that effectively triggers laser pulses according to an edge of the signal wave.

A key aspect of the invention is the approach for detection of the shape of reflected pulses to allow a precise estimation of the relative timing of different pulse series. Transmitter 14 generates a series of short pulses having a substantially stable period of oscillation. Better resolution and distance estimation is provided by transmitting pulses with a short leading edge rise time, e.g., less than one nanosecond. This presents a scanning and data acquisition challenge in that several discrete measurements of detector output must be captured over such a short time duration. The high processing speed required to take multiple samples over such a short duration is not available in a small cost-effective configuration.

A preferred pulse scanning technique relies on the repetition of reflected pulses having substantially the same timing and amplitude characteristics. Sampling circuit 42 captures and holds a sample of detection (or reflection) signal 46 when sampling control input 44 reaches a predetermined voltage level. Scanning module 18 delivers to sampling control input 44 a consistent, substantially stable oscillating signal at a frequency (e.g., 1 MHz) available from relatively cost-effective components. A sawtooth wave form is presently preferred for sampling control input 44. In this manner, a sample and hold can be triggered for each cycle of input 44 and samples can be taken from different received pulses of substantially similar timing and amplitude characteristics.

Scanning module 18 also provides a selectable voltage bias to input 44. More specifically, scanning module 18 scans through a series of different voltage biases and records the held signal at output 50. For each incremental change to the bias, a different point within a time scan window is sampled.

The resulting reconstruction of a single pulse profile by scanning over multiple pulses is illustrated in FIG. 3. The consistent repeating pulses and the precise cycling of sampling circuit 42 allow an effective nanosecond scale measurement to be completed over milliseconds. In this regard, the combination of scanning module 18 and sampling circuit 42 can be labeled a "time expansion." Although FIG. 3 shows a small set of data points retrieved at positions where a pulse has been detected, this scanning process by incremental bias preferably covers a full scan time window. As discussed further below, the scanning resolution is affected by the period of oscillation at input 44 and the number of bias increments available. In a preferred embodiment, bias increment resolution is set by the resolution of a digital-to-analog converter.

Returning to FIG. 2A and now box 68, receiver 18 scans over the time window as discussed above to detect pulse reflected from the references surface. If pulses are detected, the amplification level 46 (FIG. 1) can be adjusted to give the desired data amplitude. A first reference pulse data set is then stored and includes both pulse amplitude and timing characteristics as well as the offset setting (box 70). The offset control signal 35 at input 36 is then adjusted by a known amount so that reflected pulses are detected at an opposite end of the scan time window (box 72). A second reference pulse set of data is then recorded in the same manner as the first (box 74).

The offset is preferably adjusted such that the position of the first reference pulse (i.e., the first position) and the position of the second reference pulse are separated by a span of time less than the radiation time-of-flight to and from the distance target. This relatively narrow span of time allows processing power to be focused on high resolution pulse scanning rather than recording data at necessarily lower resolution for the entire pulse time-of-flight period.

The electronic measurement cycle then continues with a change to the shutter/lens setting to allow the transmitted pulse beam to reflect from a target object and return through optics 24 to receiver 12 (box 76). As represented by flowchart box 78, detector amplification 46 is also then preferably set to a high level (e.g., device maximum). The offset control signal 35 at input 36 is next set by pulse placement module 20 to a base setting from which the offset can be incrementally adjusted (box 80).

Figure 5:
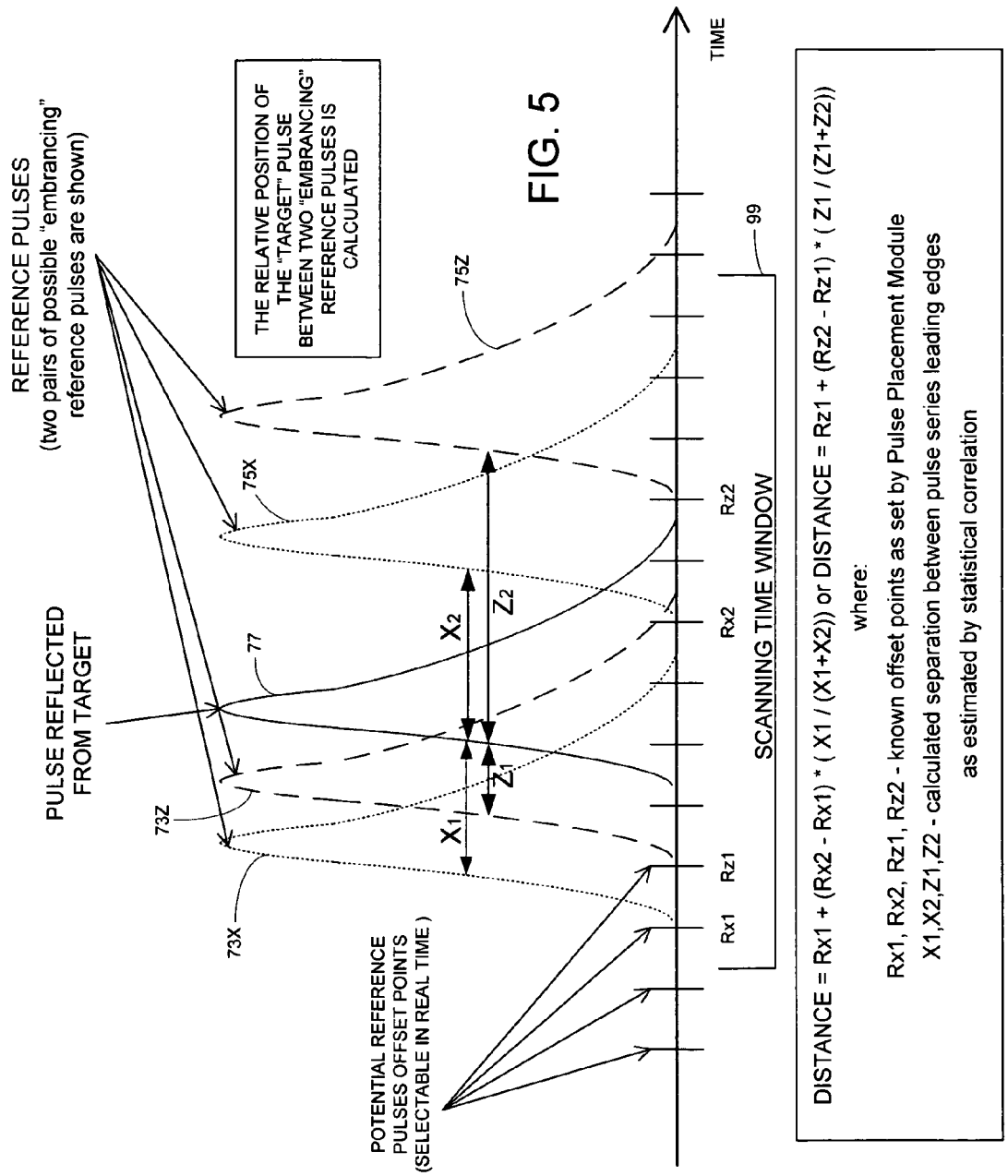

Referring now to FIG. 2B, a pair of software decision trees next dictate measurement operation as represented by boxes 82 and 86. The offset control signal 35 is adjusted (box 84) until scanning module 20 records a target-reflected pulse series within time scan window 99 (FIG. 5). If receiver 12 has been scanned for the available range of offset settings at control signal 35, the measuring device indicates that a required reflection signal from the target object has not been detected, i.e., an error or "no measurement" indication (box 88).

Amplification level 46 for detector 32 is again adjusted to match the general, overall amplitude level recorded in the first and second reference pulse sets of data (box 92). As represented by reference number 92, the offset setting which allowed the pulse series to be scanned within the time window as well as the corresponding pulse amplitude and timing characteristics data are recorded to provide an object data set. The distance measurement method relies on estimates for the separation between pulses. To improve the accuracy of pulse separation estimates, pulse data is first normalized as represented by box 94 in FIG. 2B and as further illustrated in FIG. 4.

Figure 4:
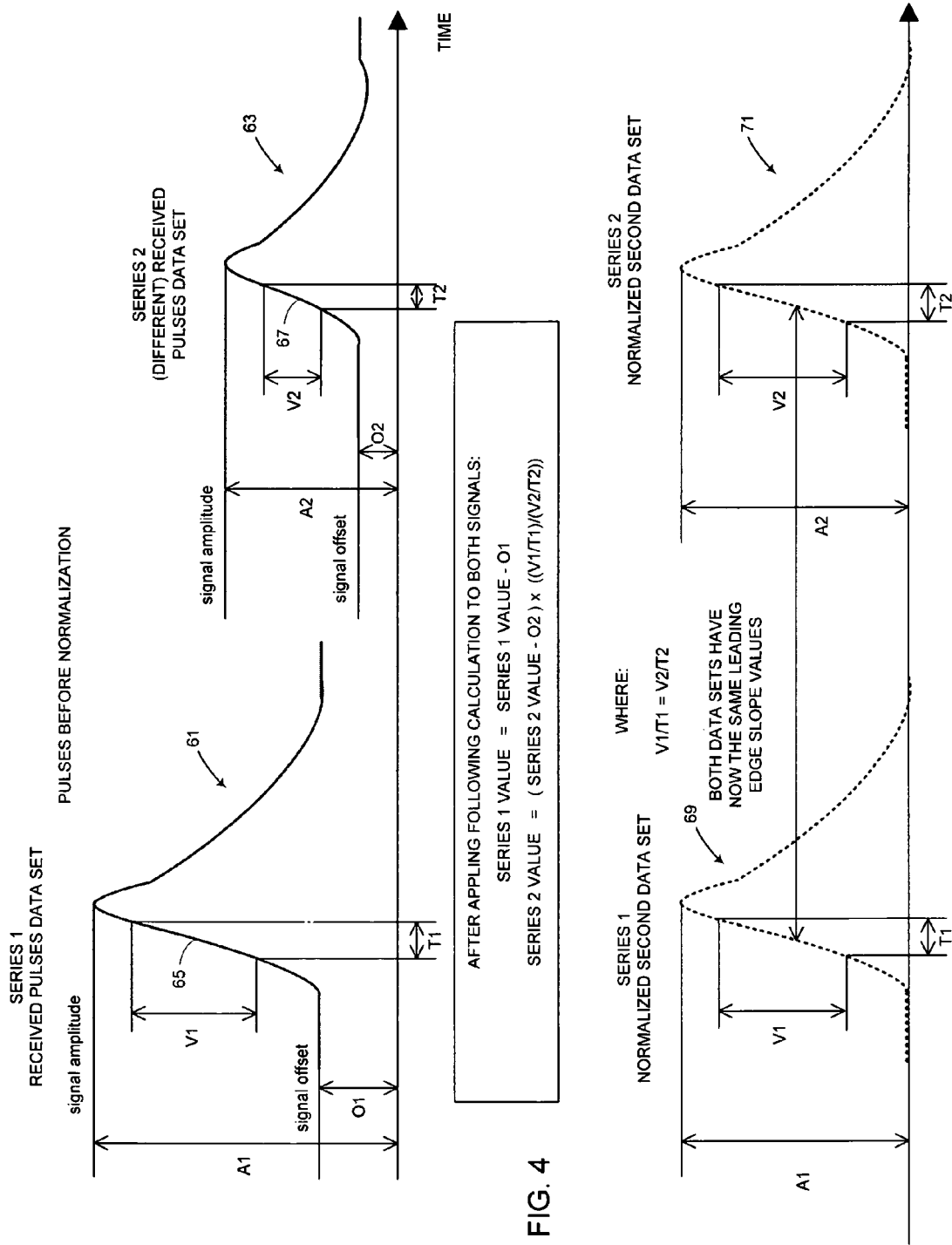
FIG. 4 contains a group of graphs for pulse data detected and recorded for different pulse series to show pulse shape and amplitude variance reflected before normalization and after normalization.

FIG. 4 is a pulse graph diagram showing pulse shapes for data normalized in amplitude and leading edge slope according to the invention. Pulse graphs 61 and 63 represent pulse records for a first series and a second series of pulses prior to any data normalization. These pulse records show shape variance in the form of different signal offsets from "zero" O1, O2 different amplitudes A1, A2 and different leading edge slopes 65, 67. Each pulse record is first normalized with respect to amplitude offset by subtraction of each respective amplitude offset. Next, a correction factor (V1/T1)/(V2/T2) is calculated and multiplied against the signal strength for the second pulse record. In a preferred method, V1, V2 and T1, T2 are determined based on the leading edge taken from 30 percent to 70 percent of offset-corrected amplitude. Graphs 69 and 71 represent the resulting normalized pulse data records.

The manipulation of pulse trigger points to provide for the appearance of pulse series within the relatively short scan time window is an important aspect of this preferred measurement method. As shown in FIG. 5, the pulse data is preferably generated and stored for the condition that one reference-reflection pulse 73 or 75 is positioned on each side of a target-reflection pulse 77. In this way, data for reference-reflection pulses embrace data for the target-reflection pulse. The measurement method may include further cycles to record data for reference-reflection pulses which are closer in time to the target-reflection pulse as illustrated in FIG. 3 with pairs of reference numbers 73X, 75X and 73Z, 75Z.

Although FIGS. 3 through 5 include graphs of complete pulses for improved understanding, in a preferred method, the stored data sets (e.g., first reference pulse data set) contain signal data of the leading edge portion of the reflected pulses rather than the entire pulse. This approach improves computation speed and reduces storage space requirements.

Returning to FIGS. 2B, the measurement method next involves calculating the separation between different pulses (box 96) and estimating distance based on the time separation calculations and the offset setting for the target object data set (box 98). A distance calculation according the invention can be represented as follows:

$$T_D = (T_o)[(R_{x1} - R_t) + (R_{x2} - R_{x1})(X_1)/(X_1 + X_2)]$$

$$D = (T_D)(C)/2$$

where $T_D$ is the time for pulse travel from reference surface to target object, $T_o$ is the time elapsed for one discrete pulse-trigger-to-scan-window offset increment, $R_t$ is the pulse-trigger-to-scan-window offset setting recorded when the target-reflection pulses are recorded in the time scan window, $R_{x1}$ is the pulse-trigger-to-scan-window offset setting recorded when the first set of reference surface pulses are recorded in the time scan window, $R_{x2}$ is the pulse-trigger-to-scan-window offset setting recorded when the second set of reference surface pulses are recorded in the time scan window, $X_1$ is the separation between the leading edge of the first series of reference surface pulses and the leading edge of the series of target pulses, $X_2$ is the separation between the leading edge of the second series of reference surface pulses and the leading edge of the series of target pulses, D is the distance between the reference surface (i.e., in effect the measuring device) and the target object, and C is the speed of electromagnetic radiation in air or other medium in which the measurement can be conducted. The separation variables and corresponding calculations for $X_1$ and $X_2$ are expressed in units of number of sampling points (or ticks) in the time scan window.

As represented by box 96 in FIG. 2B, the estimation of separation $X_1$, $X_2$ (between pulses recorded in scan time window 99) is a step in the present method required for the final distance calculation. Among available systems for estimating pulse separation, two are presently preferred. For faster logic processing, pulse separation can be estimated by calculating the difference in sample positions at a particular pulse signal level. For example, the difference in sample positions where both pulses reach fifty percent (50%) of the overall amplitude. To better address expected variations in signals detected for reflecting pulses, a statistical correlation is used to calculate a best estimate of product separation. In the preferred embodiment, a least-squares difference calculation is applied from thirty percent (30%) to seventy percent (70%). Other suitable statistical correlation algorithms include least absolute difference calculation.

After normalization (box 94), pulse record separations (box 96) and final distance calculation (box 98), the calculated distance to target is formatted and displayed in preferred units (e.g., English or metric/SI) to end a measurement cycle (box 100). In a preferred embodiment, the measurement cycle represented by the flowchart of FIGS. 2A and 2B can be completed in less than about 300 milliseconds. The measurement cycle time may vary from target to target depending upon the number of offset adjustments required to place pulses reflected from the target object in the scan time window.

EXAMPLE

A laser measuring device 110 was constructed according to an embodiment of the present invention. A schematic diagram of laser device 110 is presented in FIG. 6. Measuring device 110's major parts or elements include a pulse detector circuit 132, a sampling circuit 142, a laser diode 134, a reference surface 116, a microcontroller (e.g., TMS320F2801) 158 and a power supply 153. Device 110 also includes optics in the form of a lens 124 with an exit region 126 and a shutter mechanism 152 for selectively directing a pulse series 128 towards a target object. Operably connected to microcontroller 158 are user interface components: display 160A, keys and switches 160B and buzzer 160C. An associated power system 153 includes a battery power source 155, a main voltage supply 157 and an electronically adjustable higher-voltage supply 159 for adjusting photodiode amplification.

Both detector circuit 132 and laser emitter 134 are positioned for interaction with optics 124. Detector circuit 132 is positioned to receive reflected laser pulses concentrated by optics 124. Laser emitter 134 generates a series of pulses 128 directed through zone 126 of lens 124. The operations of laser circuit 134 and detector 132 are coordinated by microcontroller 158 via a series of links (or connections) 135, 144A, 144B, 150.

Figure 7:
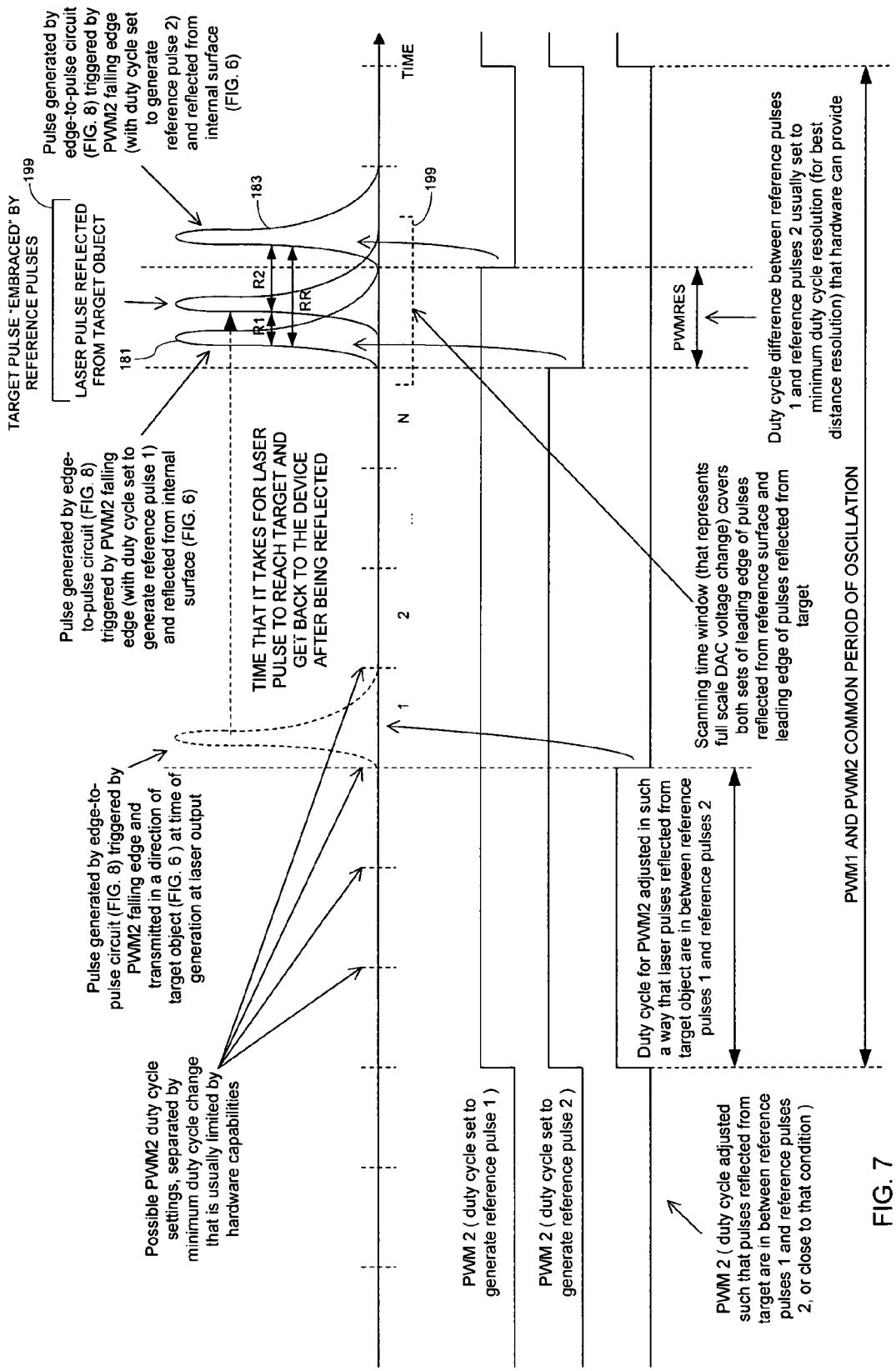
FIG. 7 is a signal timing diagram showing both driving signal timing and pulse placement for pulse data.

Microcontroller 158 features the generation of multiple reference quality oscillating signals 135 and 144A. For laser generation/transmission, microcontroller 158 supplies an offset control and laser timing signal 135. Reference-quality signal 135 preferably has a rectangular waveform and an adjustable duty-cycle as shown in FIG. 7. FIG. 7 is a signal timing diagram showing the relationship between pulse timing control signal 135 and pulse timing. The adjustable duty cycle is provided by a pulse-width modulation subcircuit 119 (PWM2) within microcontroller 158. A change in duty cycle via PWM2 of input signal 135 changes the intra-cycle timing of laser pulses generated at emitter 134 because of signal converter circuit 138. More specifically, circuit 138 is an edge-to-current pulse converter for driving laser 134 that is responsive to the falling edge of input signal 135. An adjustment in the duty cycle of signal 135 via PWM2 changes the timing of the falling edge and therefore the timing of laser pulses.

Figure 8:
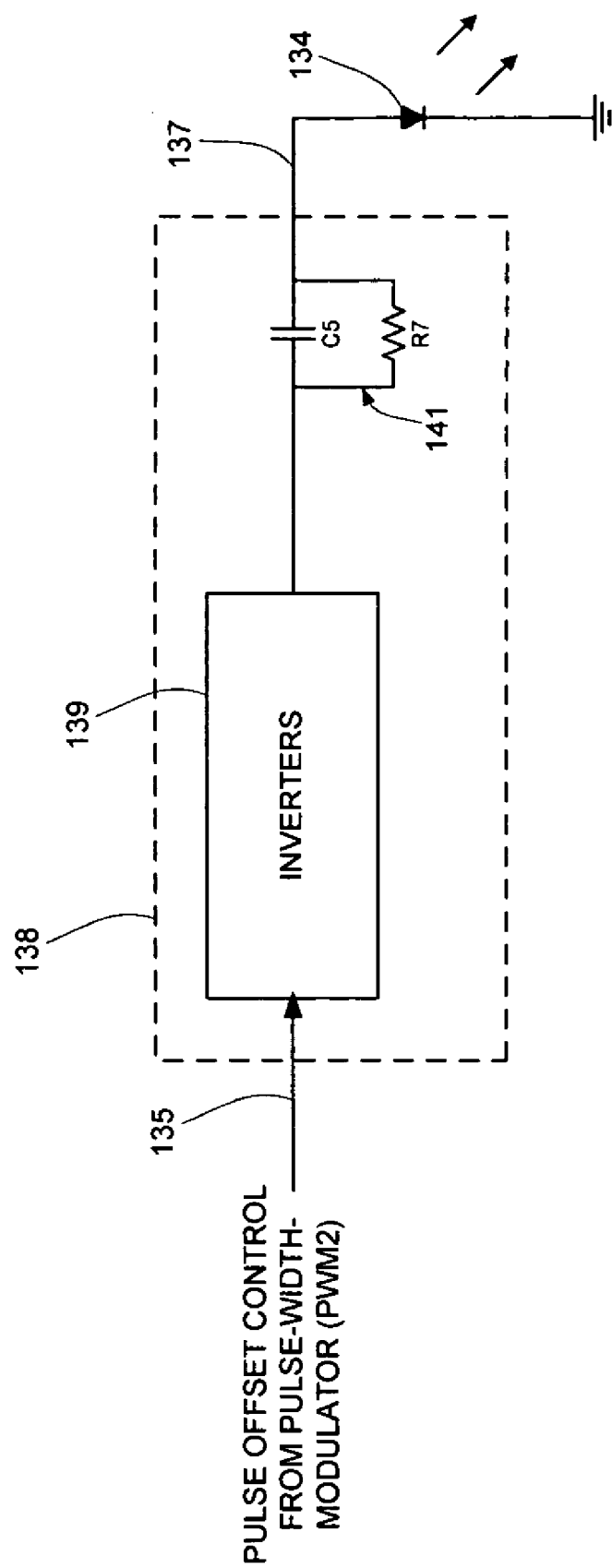
FIG. 8 is a schematic diagram for a voltage edge to current pulse converter which comprises a circuit driving a solid state laser diode.

FIG. 8 is a schematic diagram for voltage-edge to current-pulse converter 138. Laser 134 is preferably a solid state laser diode. Laser diode 134 generates laser energy in response to the current in link 137. Converter 138 includes inverters 139 such as those sold as an integrated circuit under the designation "74AC14D." Use of inverters delivers current pulses with durations independent of the slopes of the waveform of signal 135 supplied from PWM2. The values of RC network 141 (C5, R7) are provided for scaling the current pulses. The preferred resulting laser pulse duration is in the range of about 1 nanosecond to about 4 nanoseconds.

Figure 6:
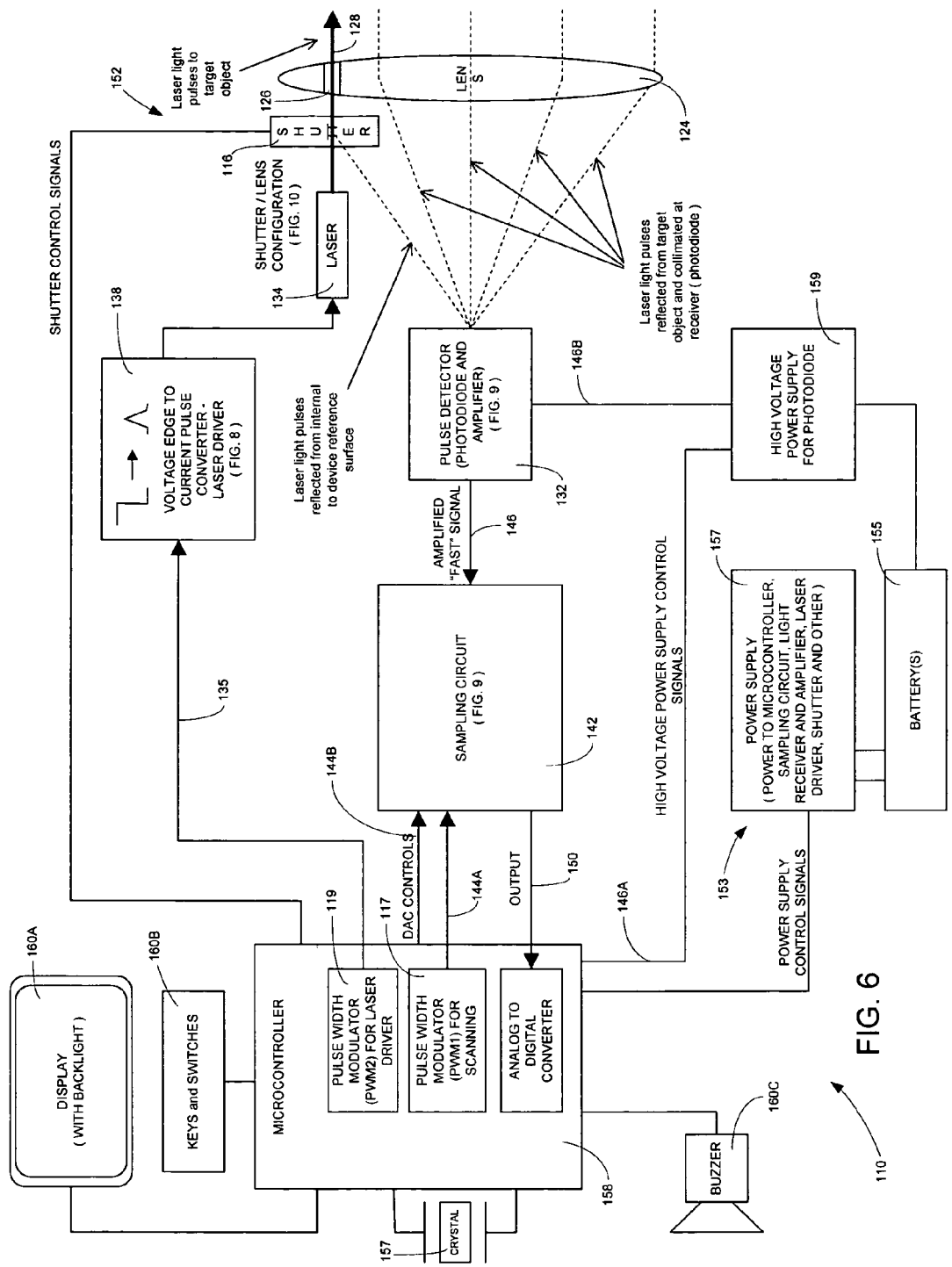
FIG. 6 is a block-style diagram illustrating preferred components for a laser distance measuring device according to the invention.
Figure 9:
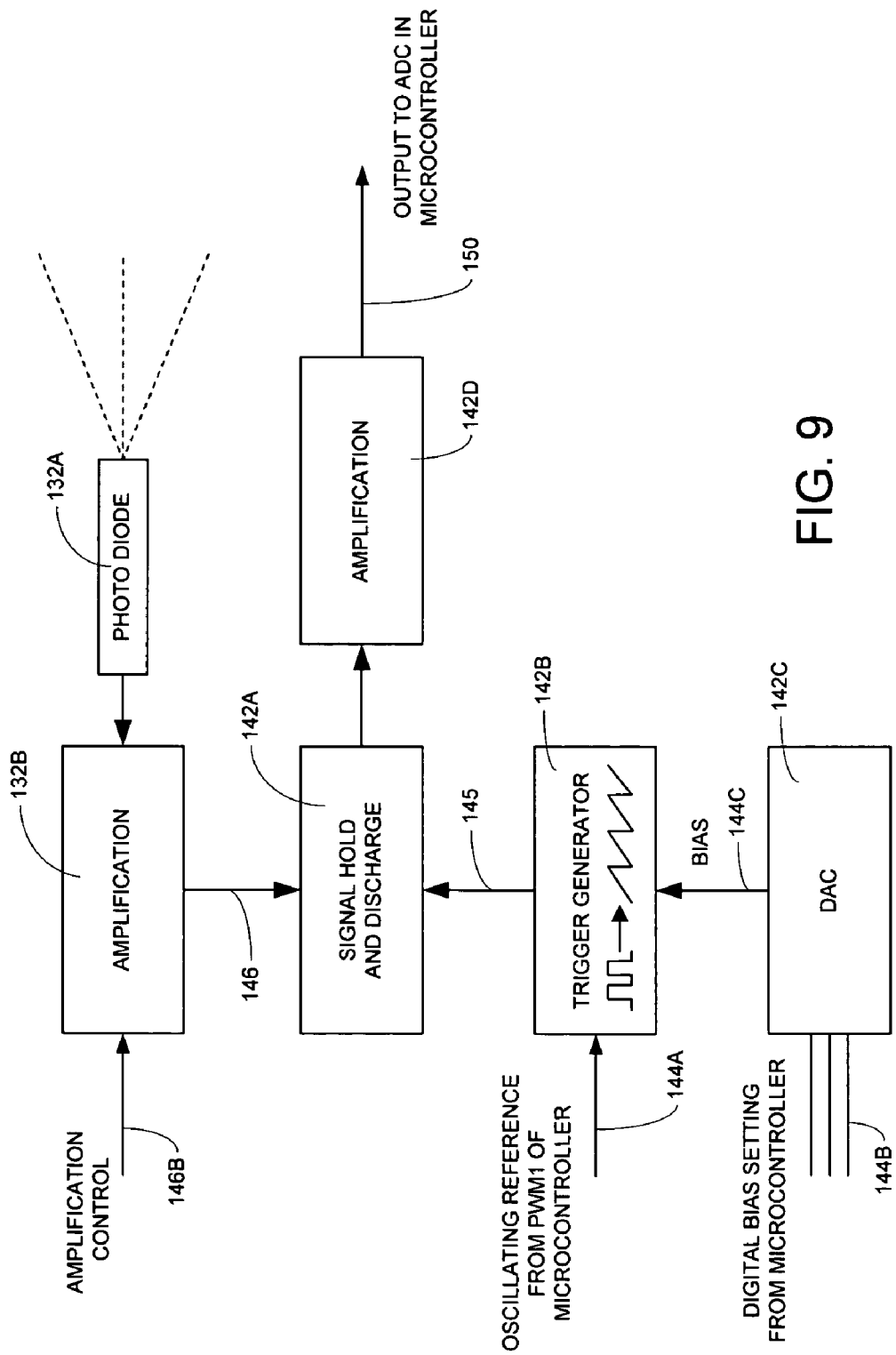
FIG. 9 is a schematic diagram for a relatively rapid voltage matching hold and reset suitable for scanning a pulse series of substantially common profiles and timing (e.g., stable shape and oscillating period)

Referring now to the block diagram in FIG. 9, scanning is provided by an avalanche photodiode 132A, an amplification circuit 132B, a signal hold and discharge circuit 142A, a sampling point trigger generator 142B, a digital-to-analog converter 142C and a sample amplification circuit 142D. The sampling and detection system has three inputs, each set by microcontroller 158: amplification power setting 146B, reference quality, oscillating signal 144A and digital, bias setting 144B. Amplification power 146B is provided by power system 153 and set via controls 146A from microcontroller 158 (FIG. 6). Oscillating signal 144A is provided by PWM1 (reference 117) in microcontroller 158. Bias setting input 144B is also set by logic in microcontroller 158.

Microcontroller logic adjusts detector amplification controls 146A, 146B, and bias level 144B to scan pulse series received at detector 132A as previously described with reference to FIG. 3. Detector amplification 132B preferably includes specialized filtering to block for ambient light levels and noise. Amplifier 132B is preferably used to amplify reflected pulses to a level of several hundred millivolts. Several stages of amplification together with the internal-to-avalanche-photodiode gain effect are used to achieve desired level of received signal amplification.

Hold/discharge subcircuit 142A is responsive to a predetermined voltage level at sampling trigger input 145 to hold (preferably by capacitor charging) a sample of the voltage level at detector amplifier output 146 for a duration longer than the pulse length. The sample hold time preferably matches the period of oscillating signals 144A and 145. Trigger generator subcircuit 142B modifies the oscillating signal waveform and applies the bias input 144C from digital-to-analog converter 142C. Generator subcircuit 142A provides a stable, reference quality sawtooth-ramp waveform to signal hold and discharge circuit 142A.

In a preferred embodiment, microcontroller 158 is configured to scan over time window 199 (FIG. 7) using the full resolution of DAC. For example, a 12-bit DAC provides about 4095 samples (or sampling points) over the scanning time window. A higher DAC resolution provides a higher scanning resolution but may also increase the relative time required to complete a scan of time window 199. The "held" voltage is read into the microcontroller at appropriate intervals but on a cycle substantially slower than the pulse duration.

The laser-pulse transmission side and the receiver side of measuring device 110 each rely on reference quality oscillating signals, signal 144A from PWM1 and signal 135 from PWM2. In the preferred embodiment as illustrated in FIG. 6, pulse generation via circuit 138 and scanning via circuit 142 are controlled with signals originating from a common resonator-regulated oscillation source. Microcontroller 158 includes a resonator oscillator circuit (e.g., Pierce, Colpitts, Hartley, Clapp, Driscoll, Seiler, Butler, Miller) and is configured for connection to a discrete quartz resonator 157. With this common reference basis, pulse series generation and pulse series scanning remain synchronized even as temperature or aging affect the characteristics of the reference oscillator.

Preferred specifications for selected elements and features of measuring device 110 are given in TABLE I, below.

TABLE I

| Parameter | Specification |
|---|---|
| Laser Wavelength | 560 nanometers |
| Pulse Frequency | 1 MHz |
| Average Pulse Power | <1000 milliwatts in pulse <5 milliwatts average |
| Pulse Leading Edge Rise Time | 2 nanoseconds |
| Scanning Window Range | 15 nanoseconds |
| Equivalent Distance Range | 2.25 meters (7.5 feet) |
| DAC Resolution | 4095 points (12 bit) |
| Scanning Resolution | 273 points per nanosecond |
| Crystal 157 Fundamental Frequency | 20 MHz |
| Pulse Driver 135 Waveform | Rectangular |
| Scanning Driver Waveform (Ref. 145) | Sawtooth |

In operation, microcontroller 158 detects a user input (e.g., button press) calling for a distance measurement. Shutter mechanism 152 is moved into position to provide internal pulse beam reflection from a reference surface to photodiode 132A. Pulse shape digital records are obtained for two PWM2 duty-cycle settings. Both PWM2 settings are at the same frequency with one duty cycle longer than the other by smallest possible time resolution. The resulting pulses 181, 183 are shown symbolically in FIG. 7. Each pulse shape record is obtained by microcontroller linear adjustment at DAC 142C (FIG. 9). Recorded data over the scanning window 199 corresponds to reflected pulses leading edges and peak values. Voltage output 150 from sampling circuit 142 is read and recorded digitally by microcontroller 158 using a preferably on-chip ADC (not separately shown). This scanning process is repeated for pulses reflected from the internal reference surface at PWM2 duty cycles differing preferably by smallest possible time resolution that the microcontroller can provide.

Shutter mechanism 152 is next moved into position that allows laser light to reach target and reflect back to lens 124 for focusing onto photodiode 132A. PWM2 duty cycle is varied until reflection from target-directed pulses is detected in between previously detected and recorded reference-surface pulses.

Reference pulse amplitudes and pulse amplitude of a signal reflected from the target object should be as close as possible. This is preferably achieved by varying gain level 146B of a photodiode 132A, which in turn is achieved by varying reverse voltage level supplied to that photodiode. Digitally recorded data in microcontroller 158 for reference surface and target pulses are normalized to have the same slope and amplitude values by mathematical computations for each point of a recorded pulse in a way that causes leading edges to have the same slope values and overall pulse shapes to have the same amplitude.

Since reference surface-reflected pulse data are separated in time by a known amount (i.e., smallest possible difference in PWM2 duty cycle), then distance between them can be calculated by equation:

distance=(speed of radiation in air)×(time difference in PWM2 duty cycles for two reference surface reflected pulses).

The distance to a target object is obtained by calculating time from reference pulses (one of them or both) to a pulses reflected from a target object (measured pulse is "in between" reference pulse which was achieved by varying PWM2 duty cycle for target pulse or by varying PWM2 duty cycles for reference pulses). Time is then converted to distance using known speed of radiation in air. Then this distance is added to a distance calculated by multiplying PWM2 duty cycle difference between PWM2 duty cycle used to generate reference surface reflected pulses and PWM2 duty cycle that was used to generate pulses reflected from a target object that were placed "in between" reference pulses. Distance to a target object is then scaled to desired units (e.g., imperial, metric, etc.) and displayed on integral display or transmitted farther for processing or remote display.

Methods and devices according to the present invention offer improved accuracy distance measurement by processing data representing pulses reflected from both an object target and a reference surface. Furthermore, the generation and recording of reference surface data for each new distance measurement improves accuracy by accommodating variations from ambient effects (e.g., temperature) and circuit aging. To detect and record data for pulses reflected from both a target object and the reference for each measurement, an optical system is provided to control pulse pathways.

Figure 10A:
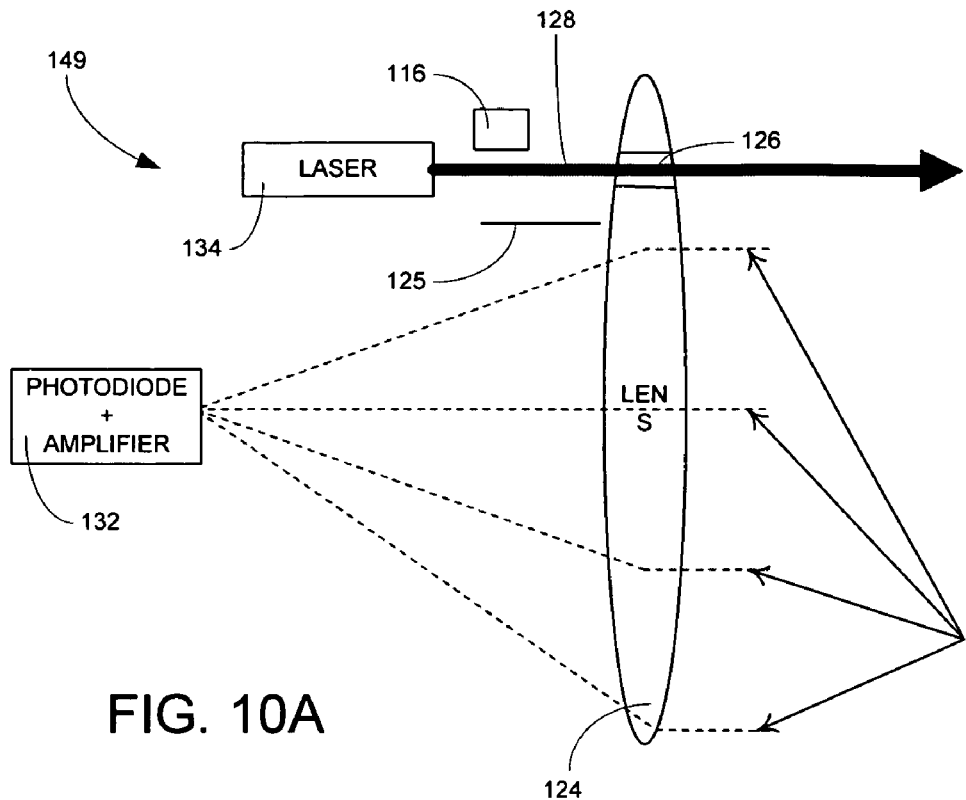
FIG. 10 (A and B) is a schematic diagram for a shutter and lens configuration to provide on-demand reflection of transmitted pulses from an internal reference surface according to the invention.
Figure 10B:
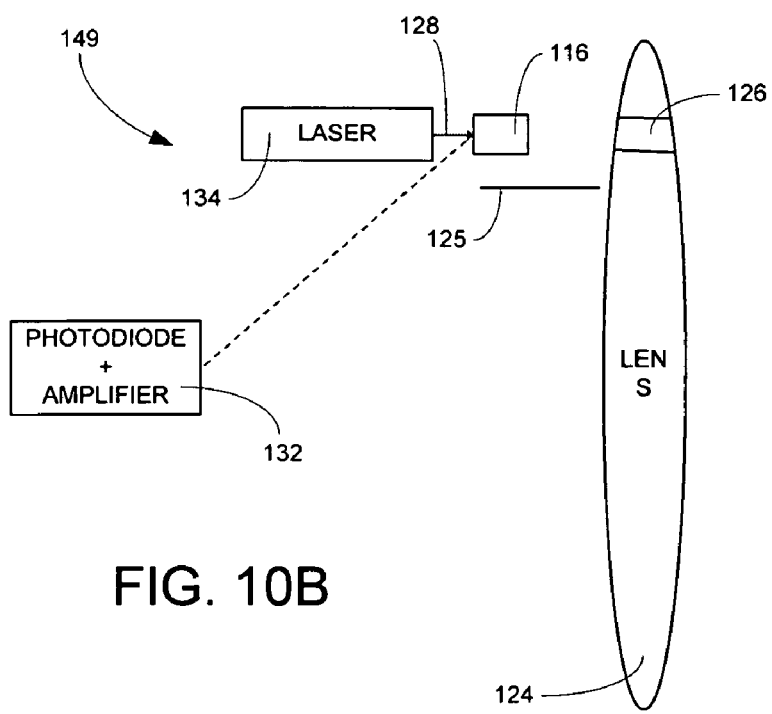

FIG. 10 (A/B) is a schematic diagram for an exemplary optical system 149 to provide "on-demand" reflection of transmitted pulses from an internal reference surface. According to system 149, a shutter 116 is movable between a first position (FIG. 10A) in the path of laser beam 128 and a second retracted position (FIG. 10B) in which beam 128 passes through zone 126 of lens 124 towards a target object. To generate and record pulses reflected from a reference surface, microcontroller 158 moves shutter 116 into the path of beam 128. In this blocking position (FIG. 10B), shutter 116 serves as the reference surface. To generate and record pulses reflected from the target object, microcontroller 158 retracts shutter 116 (FIG. 10A). A fixed blinder (or shade) 125 is provided to prevent other internally reflected radiant energy from reaching detector 132. Although a mechanical shutter is presently preferred for both system 149, a stationary liquid crystal shutter is also contemplated.

Figure 11A:
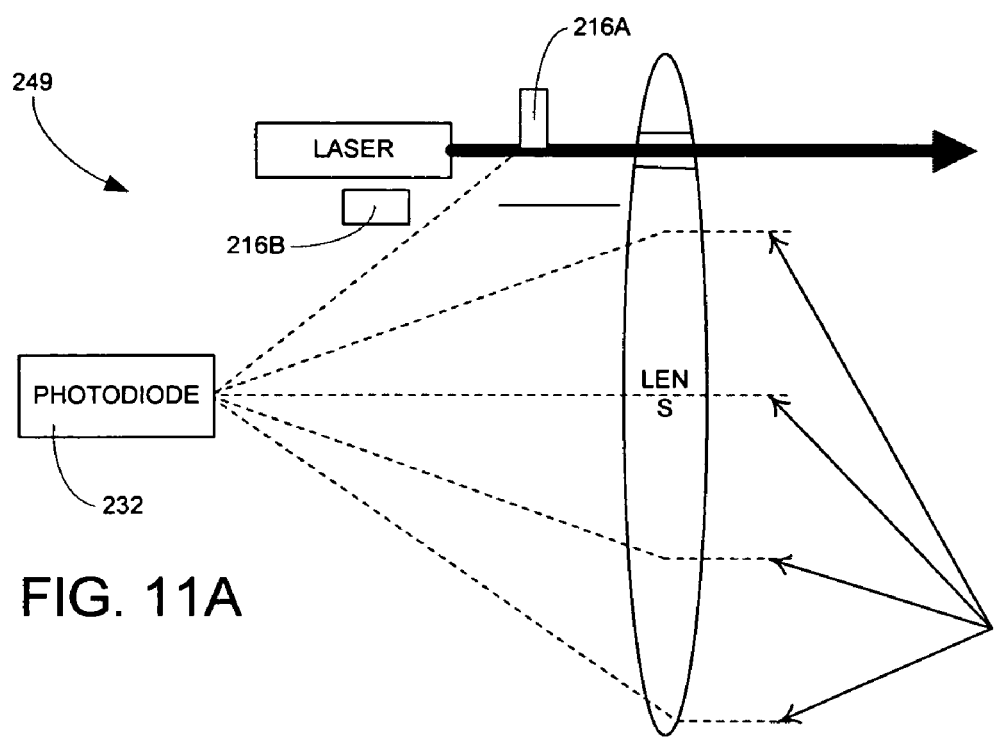
FIG. 11 (A and B) is a schematic diagram for an alternate shutter and lens configuration according to the invention.
Figure 11B:
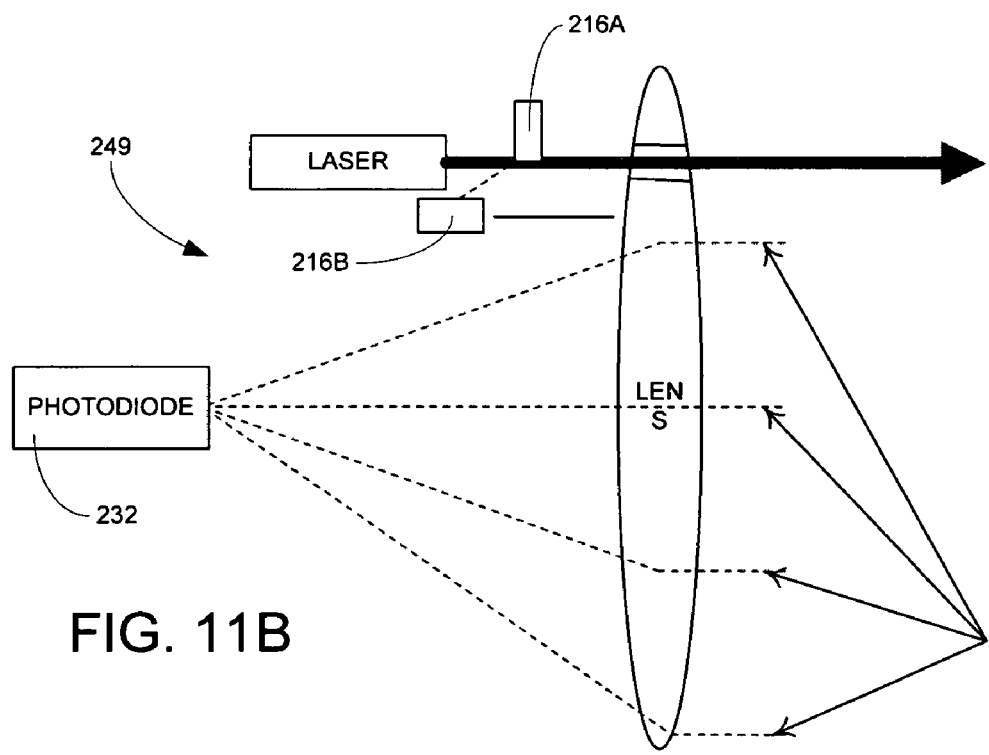

Shown in FIG. 11 (A/B) is an alternate optical system 249. System 249 comprises a fixed reflection surface 216A that reflects a portion of a laser energy continuously back in a direction of photo receiver 232 (photodiode). Shutter 216B is movable between a retracted position (FIG. 11A) allowing internal reflection to reach photodiode 232 and a blocking position (FIG. 11B) in which photodiode 232 is isolated from internal reflection. This alternate configuration is also preferably mechanical with use of an electronic shutter such as liquid crystal being a notable option.

Methods and devices according to the present invention have a number of beneficial features. For example, the component cost for devices according to the present invention can be relatively low and the elements are suitable for miniaturization. More specifically, devices embodying the present invention are relatively compact and can be conveniently packaged in a small, pocket-sized housing about 100 cubic centimeters. The devices and methods of the present invention are compatible with lower-power pulsed laser beams, e.g., no more than about 5 milliwatts average (class III laser) and no more than about 1000 milliwatts in pulse.

While this invention is susceptible to embodiment in many different forms, this specification and the accompanying drawings disclose only perferred forms as examples of the invention. The invention is not intended to be limited to the embodiments so described, however. The scope of the invention is identified in the appended claims.

What is claimed is:

1. A method for measuring the distance to a target object based on a radiant energy time of travel to and from the target object and a measuring device, the method comprising:
   generating a wave of outgoing radiant energy pulses having a substantially stable period for providing a wave of reflected pulses, said outgoing pulses having a duration shorter than said period;
   measuring reflected energy from said pulse wave over a scanning window that has a shorter effective duration than said time of travel;
   setting an offset between said outgoing pulses and said scanning window in order to capture reflected pulses at desired positions within said scanning window;
   recording said offset and reflected energy data when said outgoing wave is reflected from a reference surface and said offset has been set to capture reflected pulses in a first time position in said scanning window and provide a first reference pulse data set, said reference surface being a fixed distance from a point of measuring reflected energy;
   recording offset and reflected energy data when said outgoing wave is reflected from said reference surface and said offset has been set to capture reflected pulses in a second time position in said scanning window and provide a second reference pulse data set, said second position being different than said first position;
   recording offset and reflected energy data when said outgoing wave is reflected from the target object and said offset has been set to capture reflected pulses in said scanning window and provide an object pulse data set; and
   calculating said distance between the device and the target object according to said first reference data set, said second reference data set and said object data set.

2. The method according to claim 1 wherein said first position and said second position embrace the time position of the pulses recorded in said object data set.

3. The method according to claim 1 wherein said offsets are adjusted such that said first position and said second position fall on opposite sides of the time position of the pulses recorded in said object data set.

4. The method according to claim 1 wherein said first reference data set or said second reference data set is recorded before said object data set.

5. The method according to claim 1 wherein said offset is set by adjusting a triggering point of said outgoing pulses with respect to said scanning window.

6. The method according to claim 5 wherein said triggering point adjustment is provided via a pulse-width modulator.

7. The method according to claim 1 wherein said offset between said outgoing pulses and said scanning window is adjusted by setting a characteristic of a laser diode control signal.

8. The method according to claim 1 wherein said scanning window has a duration sufficient to capture pulses reflected from at least two different outgoing waves, each wave having a different offset.

9. The method according to claim 8 wherein each of said at least two different outgoing waves is reflected from said reference surface and differ in offset by a known value.

10. The method according to claim 1 wherein offsets are set such that said first time position and said second time position are on substantially opposite ends of said scanning window.

11. The method according to claim 1 wherein the step of calculating the distance to the target object includes calculating a separation between recorded time positions in said scanning window by correlation.

12. The method according to claim 1 wherein the step of measuring reflected energy includes normalizing amplitudes among different waves of reflected pulses.

13. The method according to claim 1 wherein the step of calculating the distance includes normalizing slopes of pulses among at least two data sets.

14. A non-contacting method for measuring the distance to a target object based on a light energy time of travel to and from the target object and a measuring device, the method comprising:
   providing a reference oscillating signal with a selectable duty-cycle;
   providing a coherent radiant energy source responsive to a wave characteristic of said oscillating signal;
   providing a radiant energy detector proximal to said radiant energy source and responsive to radiant energy for generating a reflection signal;
   providing a reference surface separated from said radiant energy detector;
   scanning said reflection signal over a time window that has a shorter effective duration than said time of travel;
   recording data corresponding to said reflection signal and said duty-cycle when said radiant energy source is projected towards said reference surface with said oscillating signal at a first duty-cycle and said reflection signal is detectable in said time window to provide a first reference pulse data set;
   recording data corresponding to said reflection signal and said duty-cycle when said radiant energy source is projected towards said reference surface with said oscillating signal at a second duty-cycle and said reflection signal is detectable in said time window to provide a second reference pulse data set, said first duty-cycle being different from said second duty-cycle by a known time offset;
   recording data corresponding to said reflection signal and said duty-cycle when said radiant energy source is projected towards the target object and said reflection signal is detectable in said time window to provide an object pulse data set; and calculating the distance between said reference surface and the target object according to said first, second and object pulse data sets.

15. The method according to claim 14 wherein said reflection signal is a wave of pulses and changes to said oscillating signal duty-cycle causes changes in a time offset between said pulses and said time window.

16. The method according to claim 14 wherein said first and second reference pulse data sets embrace said object pulse data set.

17. The method according to claim 14 wherein said object pulse data set is recorded before said first reference pulse data set.

18. The method according to claim 14 wherein said first duty-cycle differs from said second duty-cycle by a minimum available time adjustment from a pulse-width modulator circuit.

19. A method for measuring the distance to a target object based on a radiant energy time of travel to and from the target object and a measuring device, the method comprising:

generating a wave of outgoing radiant energy pulses having a substantially stable period for providing a wave of reflected pulses, said outgoing pulses having a duration shorter than said period;

measuring reflected energy from said pulse wave over a scanning window;

setting an offset between said outgoing pulses and said scanning window in order to capture reflected pulses at desired positions within said scanning window;

recording said offset and reflected energy data when said outgoing wave is reflected from a reference surface and said offset has been set to capture reflected pulses in a first time position in said scanning window and provide a first reference pulse data set, said reference surface being a fixed distance from a point of measuring reflected energy;

recording offset and reflected energy data when said outgoing wave is reflected from said reference surface and said offset has been set to capture reflected pulses in a second time position in said scanning window and provide a second reference pulse data set, wherein said first position and said second position have an effective time separation shorter than said time of travel;

recording offset and reflected energy data when said outgoing wave is reflected from the target object and said offset has been set to capture reflected pulses in said scanning window and provide an object pulse data set; and calculating said distance between the device and the target object according to said first reference data set, said second reference data set and said object data set.

20. A measuring device for measuring distance to a target object based on the time of travel of an energy pulse to and from the target object, the device comprising:

a pulse receiver including a radiant energy detector, a sampling circuit, a sampling control input and an output, said sampling circuit being in communication with said radiant energy detector and configured to provide at said output a measure of radiant energy at said detector in response to said sampling control input;

a pulse transmitter that transmits a beam of repeating pulses having a substantially stable oscillating period, said transmitter including a trigger control input and an emitter circuit responsive to said trigger control input;

a reference surface capable of reflecting at least a portion of said beam and spaced a fixed distance from said transmitter;

a scanning module in communication with said pulse receiver and controls said sampling control input to record radiant energy detected by said receiver over a time window shorter than the time of flight to and from the target object;

a pulse placement module that obtains data of said output and sets said trigger control input to adjust an offset in time between said time window and said repeating pulses; and a calculation module that processes said data to estimate a distance from the device to the target object based on said data.

* * * * *